(12) United States Patent
Hutchinson et al.

(10) Patent No.: US 12,715,241 B2
(45) Date of Patent: Aug. 25, 2026

(54) DRAG WHEEL FOR TRAILER

(71) Applicant: AUSTIN HARDWARE & SUPPLY, INC., Lee's Summit, MO (US)

(72) Inventors: Howard D Hutchinson, Milton, GA (US); Robert Walden, Buford, GA (US)

(73) Assignee: Austin Hardware & Supply, Inc., Lee's Summit, MO (US)

( * ) Notice: Subject to any disclaimer, the term of this patent is extended or adjusted under 35 U.S.C. 154(b) by 309 days.

(21) Appl. No.: 18/384,108

(22) Filed: Oct. 26, 2023

(65) Prior Publication Data

US 2025/0135802 A1 May 1, 2025

(51) Int. Cl.

| | |
|---|---|
| ***B60B 3/02*** | (2006.01) |
| ***B60B 19/12*** | (2006.01) |
| ***B60B 30/08*** | (2006.01) |
| ***B62D 21/20*** | (2006.01) |
| ***B62D 61/12*** | (2006.01) |

(52) U.S. Cl.

CPC .............. *B60B 19/12* (2013.01); *B60B 30/08* (2013.01); *B62D 21/20* (2013.01); *B62D 61/12* (2013.01)

(58) Field of Classification Search

CPC ......... B60B 19/12; B60B 30/08; B62D 21/20; B62D 61/12

See application file for complete search history.

(56) References Cited

U.S. PATENT DOCUMENTS 4,559,669 A * 12/1985 Bonzer ................. B60B 33/045 16/44

OTHER PUBLICATIONS

"Ultra-Fab Steel Jumbo Roller for Trailers and RVs—Weld On—2-1/2" Wide x 3" Tall," https://www.etrailer.com/RV-Skid-Wheels/Ultra-Fab-Products/UF48-979023.html#exp-productdetails=.all-description 16 pages, retrieved on Oct. 23, 2023.

* cited by examiner

*Primary Examiner* — Marc Q Jimenez
*Assistant Examiner* — James J Triggs
(74) *Attorney, Agent, or Firm* — Polsinelli PC

(57) ABSTRACT

A drag wheel for trailers and other vehicles is described. The drag wheel includes a wheel. The drag wheel includes a support frame. The support frame includes a skid plate, a first support member, and a second support member. The wheel is rotatably engaged to the first support member and the second support member. The wheel is positioned between the first support member and the second support member. A forward portion of the wheel is covered by the skid plate, the first support member and the second support member.

21 Claims, 4 Drawing Sheets

70
75
340
350
225
315
77
214
218
220
212
217
105
100
50
228
231

DRAG WHEEL FOR TRAILER

FIELD OF INVENTION

The present invention relates to a drag wheel for a trailer.

BACKGROUND OF INVENTION

Trailers may become damaged when towed or pushed over or against potholes, curbs, steep inclines, uneven roads, etc. When the trailer is moved over or against such surfaces, the trailer may "bottom out" or collide against such surfaces resulting in damage. This problem is especially common for longer trailers which may drag their bumpers when towed up steep inclines. This may damage under portions of the trailer, the bumpers of the trailers, or even marine lower units and outdrives. Existing drag wheels for trailers often include a flimsy construction and such may be easily damaged during use. Further, existing drag wheels are usually attached to the trailer via welding, which makes repairs or servicing of the drag wheels difficult.

SUMMARY OF INVENTION

A drag wheel for a trailer is described. The drag when includes a wheel and a support frame. The support frame is attached to a lower or bottom surface of a trailer or other towed implement. The wheel is rotatably engaged to the support frame. The support frame forms or includes a skid plate. A surface of the skid plate forms a ramp in front of the wheel. When the trailer or towed implement encounters an obstacle or bottoms out on the ground, the skid plate may drag against the obstacle or ground and provide a lifting force to the trailer to help move the trailer over the obstacle or ground.

The skid plate may further direct the obstacle or ground toward a lower surface of the wheel, which causes the wheel to rotate over the obstacle or ground. By minimizing contact directly at a side or upper surface of the wheel, possible damage to the drag wheel may be avoided.

The skid plate provides a ramping or lifting function to the drag wheel and also a protecting or enclosing function for the drag wheel. The skid plate provides a cover or partial enclosure for the wheel that protects against side or upper contact to the wheel, which may damage the wheel.

The drag wheel finds particular utility when positioned on the underside of a longer trailer proximate a bumper of the longer trailer. The drag wheel may prevent the longer trailer from dragging the bumper when the longer trailer is towed up a steep incline.

The drag wheel includes the support frame that may be used with both aluminum and steel trailers. The support frame may be welded or bolted to steel trailers. The support frame may be bolted to aluminum trailers.

In an aspect, a drag wheel for a trailer is described. A forward portion of the wheel is covered by the skid plate, a first support member and a second support member. The skid plate provides lifting or upward force to the trailer when the trailer is towed over an obstacle and the skid plate contacts the obstacle.

In another aspect, a skid plate surface may have an angle of incline of approximately 30 degrees to approximately 60 degrees relative to the horizontal axis of the trailer. The skid plate is positioned on a forward side of the wheel.

In another aspect, a drag wheel for a trailer is described. The drag wheel includes a wheel. The drag wheel includes a support frame. The support frame includes a skid plate, a first support member, and a second support member. The first support member and the second support member extend from opposite lateral sides of the skid plate. The wheel is rotatably engaged to the first support member and the second support member. The wheel is positioned between the first support member and the second support member. A forward portion of an outer diameter of the wheel is covered by the skid plate, the first support member and the second support member.

In another aspect, a drag wheel for a trailer is described. The drag wheel includes a wheel. The drag wheel includes a support frame. The support frame includes a skid plate, a first support member, and a second support member. The first support member and the second support member extend from opposite lateral sides of the skid plate. The wheel is rotatably engaged to the first support member and the second support member. The wheel is positioned between the first support member and the second support member. The first support member forms a first rear surface. The second support member forms a second rear surface. The first rear surface includes a first rear support. The second rear surface includes a second rear support. The first rear support includes a first upper contact surface. The second rear support includes a second upper contact surface. The skid plate includes an upper surface between a front of the first support member and a front of the second support member. The upper surface of the skid plate, the first upper contact surface, and the second upper contact surface are configured to mount against a lower surface of a frame of a trailer.

In another aspect, a drag wheel for a trailer is described. The drag wheel includes a wheel. The drag wheel includes a support frame. The support frame includes a skid plate, a first support member, and a second support member. The first support member and the second support member extend from opposite lateral sides of the skid plate. The first support member forms a first rear surface. The second support member forms a second rear surface. The first rear surface includes a first rear support. The second rear surface includes a second rear support. The wheel is rotatably engaged to the first support member and the second support member. The wheel is positioned between the first support member and the second support member. The wheel is positioned between the skid plate and the first rear support and second rear support.

In another aspect, a drag wheel for a trailer is described. The drag wheel includes a support frame. The support frame includes a skid plate, a first support member, and a second support member. The first support member and the second support member extend from lateral sides of the skid plate. The wheel is rotatably engaged to the first support member and the second support member. The wheel is positioned between the first support member and the second support member. A forward portion of the wheel is covered by the skid plate

DETAILED DESCRIPTION OF INVENTION

Figures 1, 2:
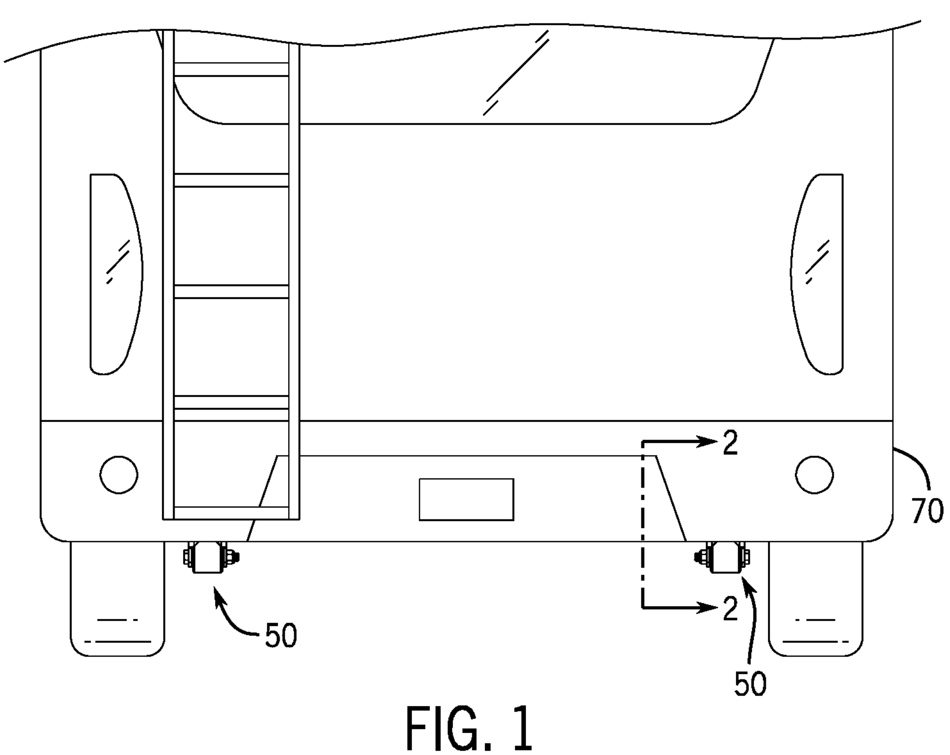
FIG. 1 is a rear view of the trailer with the drag wheel installed near the bumper.
FIG. 2 is a side view of the trailer with the drag wheel installed near the bumper.

A drag wheel 50 will now be described with respect to FIGS. 1-8. The drag wheel 50 includes a wheel 100 and a support frame 200. The drag wheel 50 may be installed on trailers, marine trailers, recreational vehicles, campers, toy haulers, enclosed trailers, flat-bed trailers, low-boy trailers, gooseneck trailers, equipment trailers, car haulers, utility trailers, and other types of vehicles and trailers. Multiple drag wheels 50 may be installed on one trailer or vehicle.

The support frame 200 of the drag wheel 50 engages or attached to a frame 75 of a trailer 70 or other bottom components of a vehicle. The support frame 200 of the drag wheel 50 includes a skid plate 210, a first support member 220, and a second support member 240. In this aspect, the first support member 220 and the second support member 240 extend from opposite lateral sides of the skid plate 210. In this aspect, the first support member 220 and the second support member 240 extend generally perpendicular to the skid plate 210.

The wheel 100 is rotatably engaged to the support frame 200. The wheel 100 is positioned between the first support member 220 and the second support member 240. The first support member 220 and the second support member 240 are joined by the skid plate 210. The first support member 220 and the second support member 240 may be integral with the skid plate 210.

The skid plate 210 may drag against or over an obstacle or the ground and provide a lifting force to the trailer 70. The skid plate 210 may act as a ramp as the drag wheel drag wheel 50 encounters the obstacle. The skid plate 210 may direct the obstacle or ground toward a lower surface on the wheel 100 such that the wheel 100 may rotate over the obstacle or ground. This eases the movement of the trailer 70 over the obstacle or ground and helps reduce friction between the trailer 70 and the obstacle or ground. During installation, the drag wheel 50 is mounted with skid plate 210 facing a forward direction of travel such that the skid plate 210 will usually contact the obstacle or ground before the wheel 100.

The wheel 100 may be rotatably engaged to the support frame support frame 200. In this aspect, the wheel 100 is formed from solid steel. In other aspects, the wheel 100 may be formed from other metals, metal alloys, or other hardened composites and plastics. The wheel 100 may be held in place by a shaft or axle, such as a threaded bolt 310 with a hexagonal head portion 315. A nut 330 may thread to the threaded bolt 310 to hold the wheel 100 in position. The threaded bolt 310 may pass through an opening 224 in the first support member 220 and an opening 244 in the second support member 240. A collar 233 may be positioned between the first support member 220 and the second support member 240, and the threaded bolt 310 may pass through an interior of the collar 233. A first bushing 235 may be positioned at a first end of the collar 233, and a second bushing 237 may be positioned at a second end of the collar 233. The first bushing 235 and the second bushing 237 provide or form bearings for the wheel 100 and may be formed from a polymeric material. In this aspect, the wheel 100 and the bushings 235 and 237 rotate relative to the threaded bolt 310 and the collar 233.

Opposite of the skid plate 210, the first support member 220 forms a first rear surface 226 and the second support member 240 forms a second rear surface 246. The first rear surface 226 includes a first rear support 228. The second rear surface 246 includes a second rear support 248. The drag wheel 50 includes the wheel 100 rotatably engaged to the support frame 200 between the skid plate 210 and the first rear support 228 and the second rear support 248. During a "bottom-out", the first rear support 228 and the second rear support 248 may contact the ground, road, curb, etc. and receive some of the force, which helps to prevent all of the force from being applied or directed to the first and second bolts 340 and 350.

The first rear support 228 includes an upper contact surface 229, and the second rear support 248 includes an upper contact surface 249. When the drag wheel 50 is installed on the trailer 70, the upper contact surface 229 and the upper contact surface 249 may be positioned flush against a lower surface 77 of the frame 75 of the trailer 70. Likewise, an upper surface 214 of the skid plate 210 may be positioned flush against the lower surface 77 of the frame 75 of the trailer 70. In this aspect, the upper surface 214, the upper contact surface 229, and the upper contact surface 249 are generally in the same plane.

In this aspect, the upper surface 214 is between a front of the first support member 220 and a front of the second support member 240. The upper surface 214 is recessed from an upper edge 225 of the first support member 220 and an upper edge 245 of the second support member 240. The frame 75 of the trailer 70 may fit in an interior 216 of the support frame 200 between the first support member 220 and the second support member 24. The interior 216 is formed at upper portion of the drag wheel 50. Inner surfaces of the first support member 220 and the second support member 240 may be flush against side surfaces of the frame 75 of the trailer 70 to provide a snug or secure fit. A distance or width between the inner surfaces of the first support member 220 and the second support member 240 may vary to accommodate different sizes of frames 75.

In this aspect, the drag wheel 50 is engaged to a portion of the frame 75 of the trailer 70 that extends generally parallel to a forward or reverse direction of travel of the trailer 70. In this aspect, the first support member 220 includes a first hole 221 and a second hole 222. The second support member 240 includes a first hole 241 and a second hole 242. A first bolt 340 may pass through the frame 75 of the trailer 70 and the first holes 221 and 241, while a second bolt 350 may pass through the frame 75 of the trailer 70 and the second holes 222 and 242. The bolts 340 and 350 are typically used to engage the drag wheel 50 to a trailer 70 made from aluminum. Addition holes and bolts may be provided, as needed, for a particular trailer 70. Further, in other aspects, the first support member 220 and the second support member 240 may welded to the frame 75 of the trailer 70, when the trailer 70 is formed from steel. Thus, the upper surface 214 and the upper contact surfaces 229 and 249 are positioned or mounted against the lower surface 77 of the frame 75 with the bolts 340 and 350 securing the engagement.

The first rear support 228 and the second rear support 248 may angle or bend inward towards a center line of the support frame 200. The first rear support 228 and the second rear support 248 may be integral with the first support member 220 and the second support member 240, respectively. The first rear support 228 and the second rear support 248 may angle or extend inward at a generally perpendicular angle with the first support member 220 and the second support member 240, respectively.

The first rear support 228 further includes a lower contact surface 231, and the second rear support 248 includes a lower contact surface 251. During a "bottom-out", the lower contact surface 231 and the lower contact surface 251 may contact the ground, road, curb, etc. and receive some of the contact force and transfer it to the frame 75 of the trailer 70. This may relieve or distribute the contact force from being directed primarily against the first and second bolts 340 and 350.

In this aspect, a tangent of the wheel 100 is generally aligned with the skid plate surface 212. In other words, the outer diameter 105 of the wheel 100 is in approximately the same plane as the plane formed by the skid plate surface 212. Thus, the outer diameter 105 of the wheel 100 is in a first plane, the skid plate surface 212 of the skid plate 210 plate forms a second plane, and the first plane and the second plane are approximately the same. A plane 113 is identified in FIG. 4, which is shared by the outer diameter 105 of the wheel 100 and the skid plate surface 212 of the skid plate 210. This provides for the skid plate surface 212 to ride over or ramp over the obstacle and then the wheel 100 contacts the obstacle. This provides a smooth transition between the skid plate surface 212 and the wheel 100.

The skid plate surface 212 may have an angle of incline of approximately 30 degrees to approximately 60 degrees relative to the horizontal axis of the trailer 70. In the aspect of FIGS. 1-8, the skid plate surface 212 has an angle of incline of approximately 35 to approximately 45 degrees relative to the horizontal axis of the trailer 70. The angle may vary depending on wheel height, trailer length, the frame type, frame direction, etc.

The skid plate 210 is positioned adjacent to a forward side of the wheel 100. A lower side 217 of the skid plate 210 is positioned close to the forward side of the wheel 100, while an upper side 218 of the skid plate 210 is positioned away from the forward side of the wheel 100. The skid plate 210 angles upward from the lower side 217 to the upper side 218. The skid plate 210 may include the above-described angles of incline between the lower side 217 and the upper side 218. The skid plate surface 212 may include a generally flat or linear construction between the lower side 217 and the upper side 218. The lower side 217 of the skid plate 210 is positioned close to the outer diameter 105 of the wheel 100 to provide a smoother transition between the skid plate 210 and the wheel 100. The lower side 217 may be approximately ¼ inch to approximately 3 inches from the wheel 100. In the aspect of FIGS. 1-8, the lower side 217 is approximately ¼ inch from the wheel 100.

Figure 3:
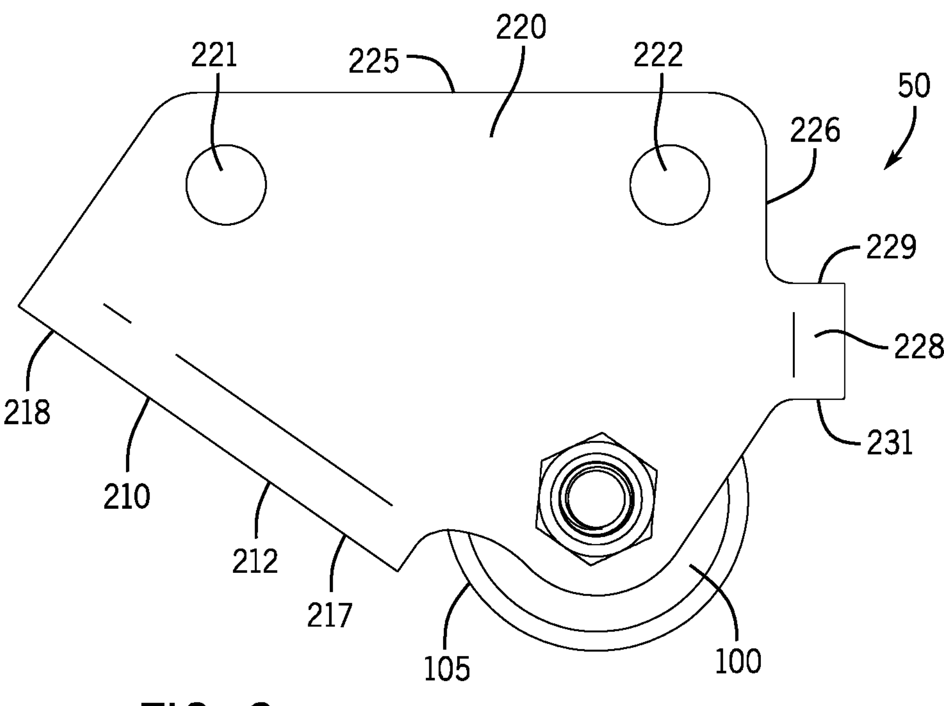
FIG. 3 is a side view of the drag wheel.
Figure 4:
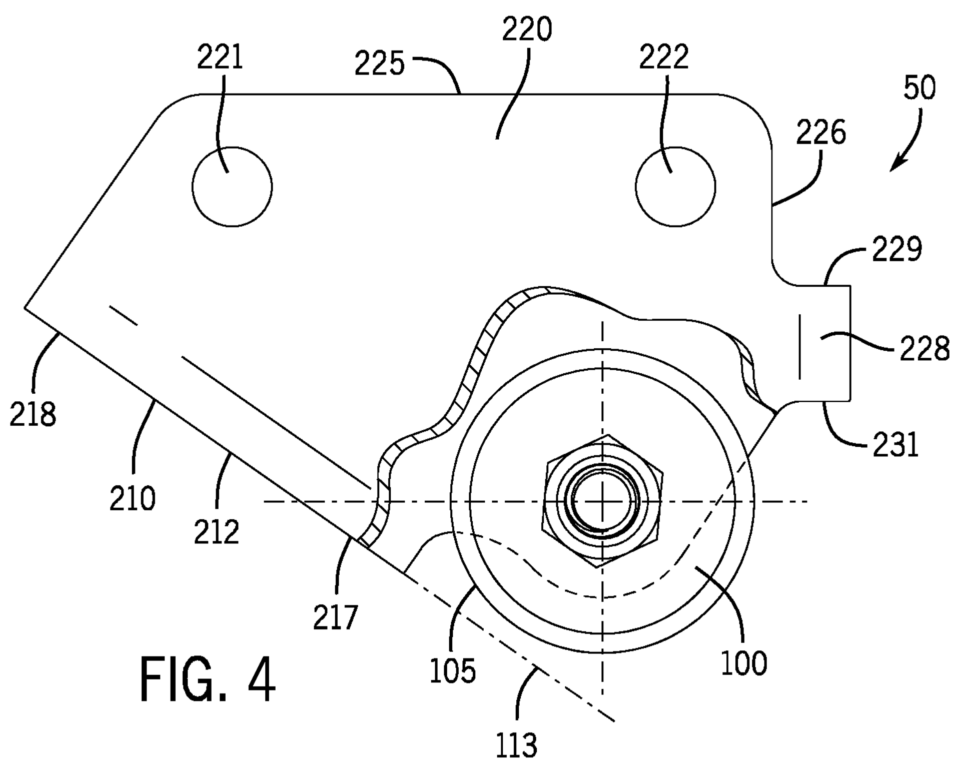
FIG. 4 is a side view of the drag wheel.
Figures 5, 6, 7:
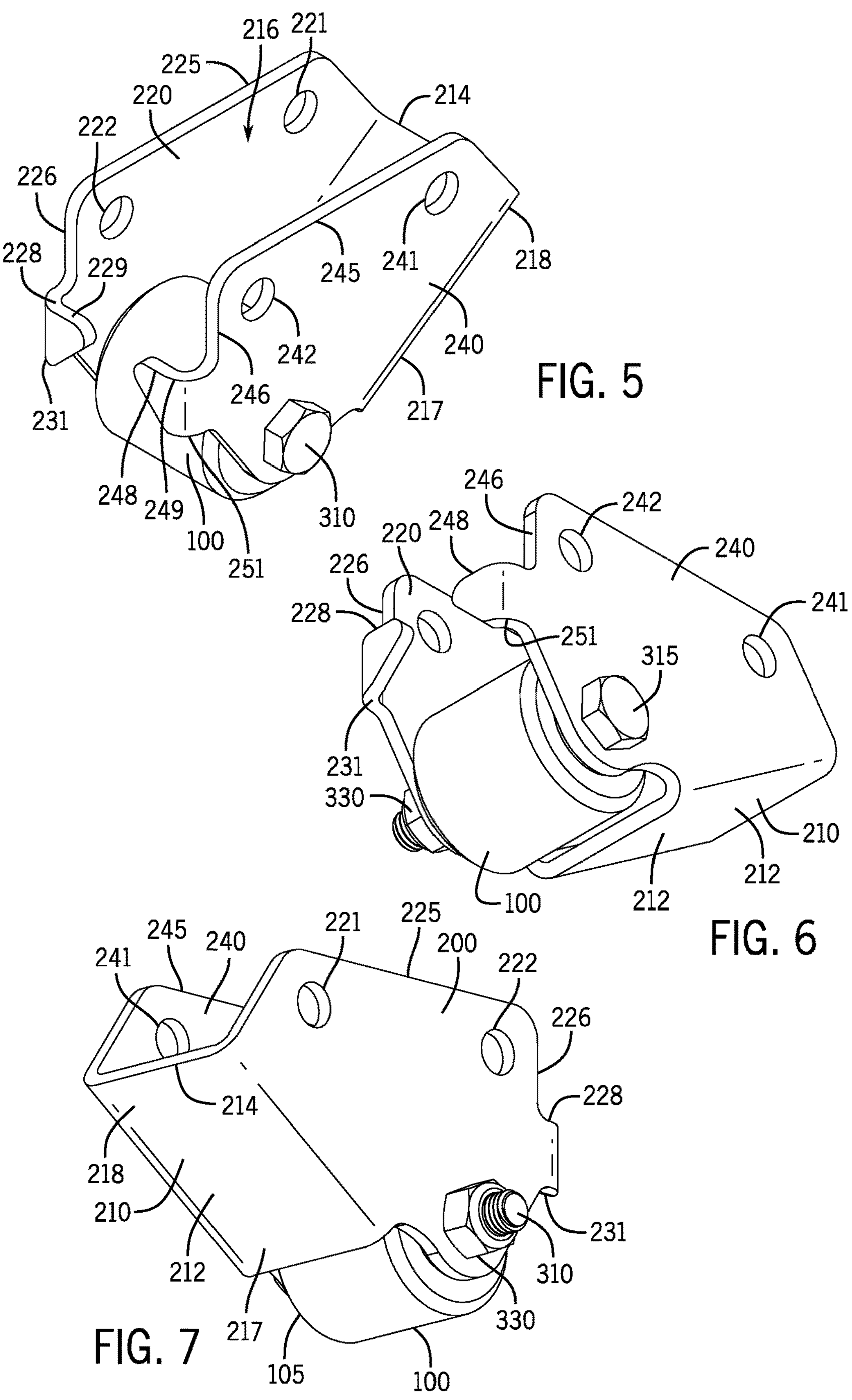
FIG. 5 is a rear upper perspective view of the drag wheel.
FIG. 6 is a rear lower perspective view of the drag wheel.
FIG. 7 is a front lower perspective view of the drag wheel.
Figure 8:
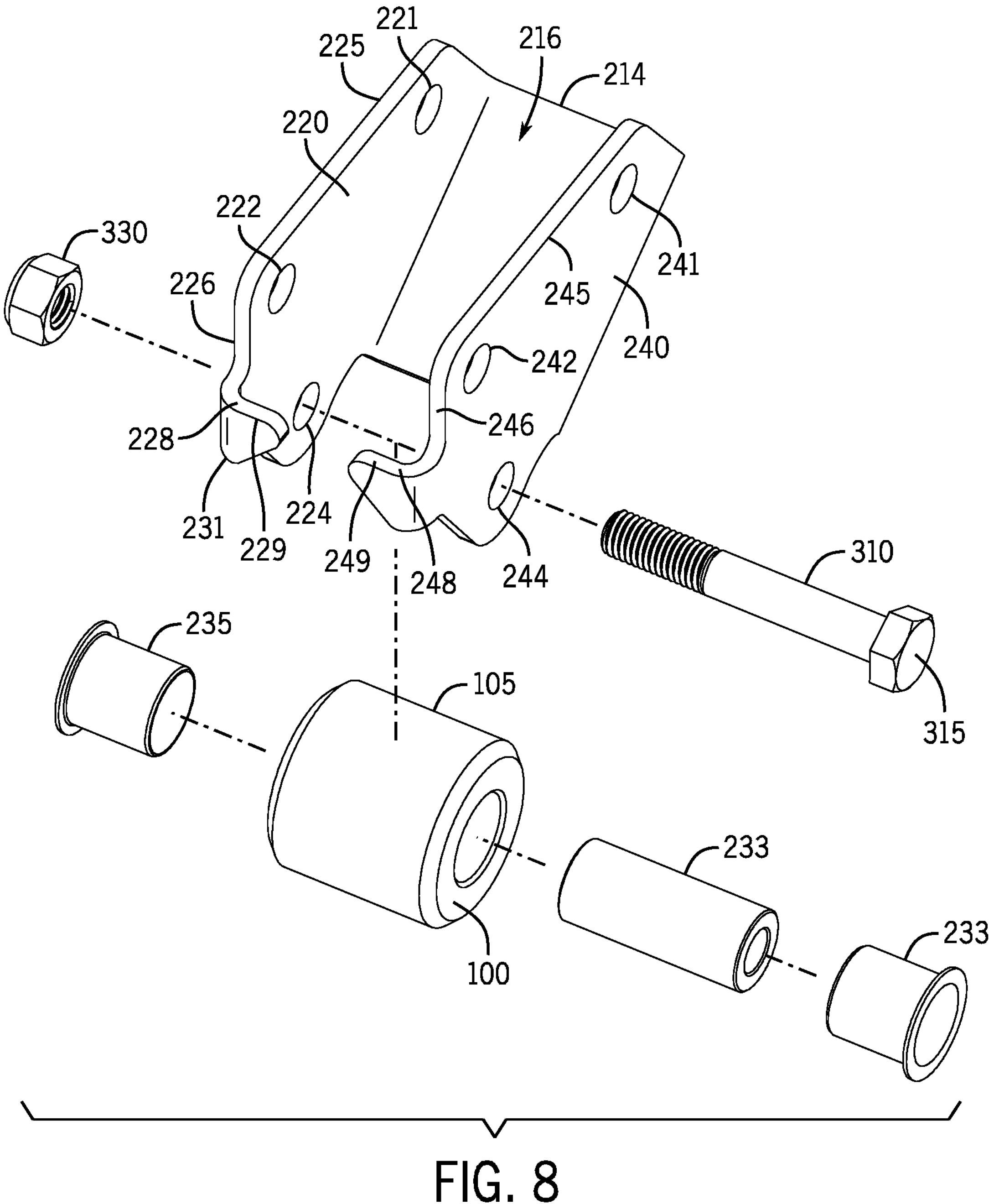
FIG. 8 is an exploded view of the drag wheel.

The skid plate 210 also acts as a guard to help prevent the ground, road, curb, etc. from contacting a front upper lateral portion of the outer diameter 105 of the wheel 100 where the wheel 100 could be damaged. The skid plate 210 helps to prevent the ground, road, curb, etc. from contacting the wheel 100 in manner that is perpendicular to the axis of rotation of the wheel 100. This reduces possible damage to the drag wheel 50. With respect to FIGS. 3 and 4, the upper left side of the outer diameter 105 of the wheel 100 is covered by the skid plate 210. In this aspect, as shown in FIGS. 3 and 4, the outer diameter 105 of the wheel 100 is covered from approximately 250 degrees to 360 degrees on the left upper or forward upper side of the wheel 100. A portion of the right upper or rear upper side may of the wheel 100 may further be covered. The skid plate 210, the first support member 220, the second support member 240 or combinations thereof may cover or protect the left upper or forward upper side of the wheel 100.

The first rear surface 226 and the second rear surface 246 of the support frame 200 are sized and shaped such that the outer diameter 105 of the wheel 100 extends beyond the first rear surface 226 and the second rear surface 246. When the trailer 70 is moving in a reverse direction, this permits the outer diameter 105 of the wheel 100 to contact the ground, road, curb, etc. before the support frame 200.

The first rear surface 226 includes the first rear support 228. The second rear surface 246 includes the second rear support 248. From both of the first rear support 228 and the second rear support 248, the first rear surface 226 and the second rear surface 246 angle inward towards a center of this support frame 200. This assists in exposing the outer diameter 105 of the wheel 100. With respect to FIGS. 3 and 4, much of a rear portion of the outer diameter 105 of the wheel 100 is exposed and ready to roll against the ground, road, curb, etc.

What is claimed is:

1. A drag wheel for a trailer, comprising:
a wheel;
a support frame, the support frame comprising a skid plate, a first support member, and a second support member;
the first support member and the second support member extend from opposite lateral sides of the skid plate;
the skid plate joins the first support member and the second support member, the skid plate forming a ramp surface in front of the wheel;
the wheel is rotatably engaged to the first support member and the second support member, and the wheel is positioned between the first support member and the second support member; and
a forward portion of an outer diameter of the wheel is covered by the skid plate, the first support member and the second support member.

2. The drag wheel for a trailer according to claim 1, wherein the skid plate is rigidly attached to the first support member and the second support member.

3. The drag wheel for a trailer according to claim 2, wherein the surface of the skid plate configured to provide a lifting action to the trailer when the trailer is towed or pulled over an obstacle.

4. The drag wheel for a trailer according to claim 1, wherein a surface of the skid plate forms an angle of incline of approximately 30 degrees to approximately 60 degrees relative to a horizontal axis.

5. The drag wheel for a trailer according to claim 1, wherein a tangent of the wheel is generally aligned with a surface of the skid plate.

6. The drag wheel for a trailer according to claim 1, wherein an outer diameter of the wheel is in a first plane, a surface of the skid plate is in a second plane, and the first plane and the second plane are approximately the same.

7. The drag wheel for a trailer according to claim 1, wherein the first support member and the second support member extend generally perpendicular to the skid plate.

8. The drag wheel for a trailer according to claim 1, wherein the skid plate includes an upper surface between a front of the first support member and a front of the second support member, the upper surface configured to mount against a lower surface of a frame of a trailer.

9. The drag wheel for a trailer according to claim 8, wherein the upper surface is recessed from an upper edge of the first support member and an upper edge of the second support member.

10. The drag wheel for a trailer according to claim 1, wherein the support frame forms an interior between the first support member and the second support member, and the interior is configured to receive a frame of the trailer.

11. The drag wheel for a trailer according to claim 1, wherein an outer diameter of an upper front portion of the wheel is covered by the first support member, and the second support member, and the skid plate.

12. The drag wheel for a trailer according to claim 1, wherein an outer diameter of the wheel is covered by the first support member and the second support member from approximately 250 degrees to approximately 360 degrees on a forward upper side of the wheel.

13. A drag wheel for a trailer, comprising: a wheel;

a support frame, the support frame comprising a skid plate, a first support member, and a second support member;

the first support member and the second support member extend from opposite lateral sides of the skid plate;

the wheel is rotatably engaged to the first support member and the second support member, and the wheel is positioned between the first support member and the second support member;

a forward portion of an outer diameter of the wheel is covered by the skid plate, the first support member and the second support member; and wherein a first rear surface and a second rear surface of the support frame are sized and shaped such that the outer diameter of the wheel extends beyond the first rear surface and the second rear surface.

14. A drag wheel for a trailer, comprising: a wheel;

a support frame, the support frame comprising a skid plate, a first support member, and a second support member;

the first support member and the second support member extend from opposite lateral sides of the skid plate;

the wheel is rotatably engaged to the first support member and the second support member, and the wheel is positioned between the first support member and the second support member;

a forward portion of an outer diameter of the wheel is covered by the skid plate, the first support member and the second support member; and wherein the first support member forms a first rear surface, the second support member forms a second rear surface, the first rear surface includes a first rear support, and the second rear surface includes a second rear support.

15. The drag wheel for a trailer according to claim 14, wherein the wheel is rotatably engaged to the support frame between the skid plate and the first rear support and second rear support.

16. The drag wheel for a trailer according to claim 14, wherein the first rear support and the second rear support angle or bend inward towards a center line of the support frame.

17. The drag wheel for a trailer according to claim 1, wherein a collar is positioned between the first support member and the second support member, and the wheel rotates relative to the collar.

18. A drag wheel for a trailer, comprising: a wheel;

a support frame, the support frame comprising a skid plate, a first support member, and a second support member;

the first support member and the second support member extend from opposite lateral sides of the skid plate;

the wheel is rotatably engaged to the first support member and the second support member, and the wheel is positioned between the first support member and the second support member;

the first support member forms a first rear surface, the second support member forms a second rear surface, the first rear surface includes a first rear support, and the second rear surface includes a second rear support, the first rear support includes a first upper contact surface, and the second rear support includes a second upper contact surface;

the skid plate includes an upper surface between a front of the first support member and a front of the second support member; and the upper surface of the skid plate, the first upper contact surface, and the second upper contact surface are configured to mount against a lower surface of a frame of a trailer.

19. The drag wheel for a trailer according to claim 18, wherein the upper surface of the skid plate, the first upper contact surface, and the second upper contact surface are generally in the same plane.

20. A drag wheel for a trailer, comprising: a wheel;

a support frame, the support frame comprising a skid plate, a first support member, and a second support member;

the first support member and the second support member extend from opposite lateral sides of the skid plate;

the first support member forms a first rear surface, the second support member forms a second rear surface, the first rear surface includes a first rear support, and the second rear surface includes a second rear support; and the wheel is rotatably engaged to the first support member and the second support member, and the wheel is positioned between the first support member and the second support member, and the wheel is positioned between the skid plate and the first rear support and second rear support.

21. A drag wheel for a trailer, comprising: a wheel;

a support frame, the support frame comprising a skid plate, a first support member, and a second support member;

the first support member and the second support member extend from sides of the skid plate;

the skid plate joins the first support member and the second support member, the skid plate forming a ramp surface in front of the wheel;

the wheel is rotatably engaged to the first support member and the second support member, and the wheel is positioned between the first support member and the second support member; and a forward portion of the wheel is covered by the skid plate.

* * * * *